(12) United States Patent
Ballard et al.

(10) Patent No.: US 8,303,337 B2
(45) Date of Patent: Nov. 6, 2012

(54) HYBRID CABLE FOR CONVEYING DATA AND POWER

(75) Inventors: Claudio R. Ballard, Fort Lauderdale, FL (US); Andrew P. Sargent, Chittenden, VT (US); Jeffrey N. Seward, Fairfax, VT (US)

(73) Assignee: Veedims, LLC, Pompano Beach, FL (US)

( * ) Notice: Subject to any disclaimer, the term of this patent is extended or adjusted under 35 U.S.C. 154(b) by 77 days.

(21) Appl. No.: 12/820,875

(22) Filed: Jun. 22, 2010

(65) Prior Publication Data

US 2010/0319956 A1 Dec. 23, 2010

Related U.S. Application Data

(63) Continuation-in-part of application No. 12/134,454, filed on Jun. 6, 2008, now Pat. No. 7,740,501.

(60) Provisional application No. 60/933,358, filed on Jun. 6, 2007.

(51) Int. Cl.
*H01R 9/05* (2006.01)

(52) U.S. Cl. .................................... 439/578; 174/113 R

(58) Field of Classification Search .................. 439/578; 174/105 R, 113 R
See application file for complete search history.

(56) References Cited

U.S. PATENT DOCUMENTS

| | | | |
|---|---|---|---|
| 1,149,583 A | 8/1915 | Hutchison | |
| 1,162,421 A | 11/1915 | Welch | |
| 1,205,371 A | 11/1916 | Marshall | |
| 1,267,079 A | 5/1918 | Jensen | |
| 1,308,495 A | 7/1919 | Johnson | |
| D58,530 S | 8/1921 | Anibal | |
| 1,461,457 A | 7/1923 | Rice | |
| 1,594,993 A | 8/1926 | Bedford | |
| 1,663,026 A | 3/1928 | Schultze | |
| 1,828,608 A | 10/1931 | Mack | |
| 1,848,064 A | 3/1932 | Oishei | |
| 1,908,503 A | 5/1933 | Day et al. | |
| 2,009,591 A | 7/1935 | Radford | |
| 2,026,444 A | 12/1935 | Trott | |
| 2,046,779 A | 7/1936 | Hack | |
| 2,136,472 A | 11/1938 | Sinclair | |
| 2,151,976 A | 3/1939 | Eduard | |
| 2,180,731 A | 11/1939 | Dickinson | |
| 2,229,192 A | 1/1941 | Schultz | |
| 2,230,906 A | 2/1941 | Poe Potts | |
| 2,235,716 A | 3/1941 | Lucius | |
| 2,256,170 A | 9/1941 | Powers | |
| 2,496,700 A | 2/1950 | Cole | |
| 2,728,230 A | 12/1955 | Haramic | |

(Continued)

FOREIGN PATENT DOCUMENTS

DE 19526809 A1 1/1997

(Continued)

OTHER PUBLICATIONS

PCT: International Search Report and Written Opinion of PCT/US2010/041231 (related application); Apr. 21, 2011; 9 pgs.

(Continued)

*Primary Examiner* — Thanh Tam Le

(74) *Attorney, Agent, or Firm* — Howison & Arnott, L.L.P.

(57) ABSTRACT

Hybrid cables for conveying data and conducting operating power to electrically powered devices and a vehicle utilizing such cables are disclosed.

10 Claims, 11 Drawing Sheets

U.S. PATENT DOCUMENTS

| | | | |
|---|---|---|---|
| 2,786,359 A | 3/1957 | Karlan et al. | |
| 2,801,118 A | 7/1957 | Amesbury | |
| 2,881,860 A | 4/1959 | Ternes | |
| 2,897,916 A | 8/1959 | Probst | |
| 3,133,741 A | 5/1964 | Garabello | |
| 3,259,684 A | 7/1966 | Wakefield | |
| 3,264,892 A | 8/1966 | Boman et al. | |
| 3,269,208 A | 8/1966 | Whitchurch | |
| 3,279,834 A | 10/1966 | Budzynski | |
| 3,323,609 A | 6/1967 | Rosenberger et al. | |
| 3,351,364 A | 11/1967 | Warn et al. | |
| 3,433,891 A | 3/1969 | MacKenzie, Jr. et al. | |
| 3,435,701 A | 4/1969 | Bucher | |
| 3,440,897 A | 4/1969 | Dutt et al. | |
| 3,482,465 A | 12/1969 | Lusted | |
| 3,641,746 A | 2/1972 | Smith et al. | |
| 3,691,525 A | 9/1972 | McClellan et al. | |
| 3,795,760 A * | 3/1974 | Raw et al. | 174/128.1 |
| 3,800,910 A | 4/1974 | Rose | |
| 3,831,209 A | 8/1974 | Clingman | |
| 4,025,896 A | 5/1977 | Hintze et al. | |
| 4,061,054 A | 12/1977 | Wenninger | |
| 4,135,593 A | 1/1979 | Fowkes | |
| 4,138,160 A | 2/1979 | Lohmeyer | |
| 4,236,274 A | 12/1980 | Omote et al. | |
| 4,266,438 A | 5/1981 | Kessmar | |
| 4,331,209 A | 5/1982 | Bauer et al. | |
| 4,333,360 A | 6/1982 | Simmons | |
| 4,354,458 A | 10/1982 | Bury | |
| 4,441,382 A | 4/1984 | Snooks | |
| 4,515,393 A | 5/1985 | Sauter | |
| 4,519,268 A | 5/1985 | Oda | |
| 4,548,166 A | 10/1985 | Gest | |
| 4,558,955 A | 12/1985 | Herchenbach | |
| 4,561,325 A | 12/1985 | Jester | |
| 4,562,895 A | 1/1986 | Kirchweger | |
| 4,569,245 A | 2/1986 | Feldt et al. | |
| 4,590,339 A | 5/1986 | Scott-Jackson et al. | |
| 4,591,211 A | 5/1986 | Browning et al. | |
| 4,597,306 A | 7/1986 | Tsuji | |
| 4,646,864 A | 3/1987 | Racchi | |
| 4,707,788 A | 11/1987 | Tashiro et al. | |
| 4,742,884 A | 5/1988 | Ishikawa | |
| 4,747,636 A | 5/1988 | Harasaki et al. | |
| 4,770,522 A | 9/1988 | Alten | |
| 4,771,368 A | 9/1988 | Tsukamoto et al. | |
| 4,772,299 A | 9/1988 | Bogusz | |
| 4,778,029 A | 10/1988 | Thornburgh | |
| 4,787,257 A | 11/1988 | Ott et al. | |
| 4,807,490 A | 2/1989 | Foggini | |
| 4,825,669 A | 5/1989 | Herrera | |
| 4,957,071 A | 9/1990 | Matsuo et al. | |
| 4,987,522 A | 1/1991 | Miyano et al. | |
| 5,016,578 A | 5/1991 | Ogawa et al. | |
| 5,022,479 A | 6/1991 | Kiser et al. | |
| 5,048,471 A | 9/1991 | Takli et al. | |
| 5,064,247 A | 11/1991 | Alten | |
| 5,066,062 A | 11/1991 | Sekulovski | |
| 5,121,818 A | 6/1992 | McComic | |
| 5,133,750 A | 7/1992 | Momose et al. | |
| 5,149,915 A * | 9/1992 | Brunker et al. | 174/36 |
| 5,156,198 A | 10/1992 | Hall | |
| 5,161,513 A | 11/1992 | Feldinger | |
| 5,195,092 A | 3/1993 | Wilson et al. | |
| 5,236,219 A | 8/1993 | Jambor et al. | |
| 5,304,739 A | 4/1994 | Klug et al. | |
| 5,313,853 A | 5/1994 | Olmsted et al. | |
| 5,317,880 A | 6/1994 | Spears | |
| 5,322,340 A | 6/1994 | Sato et al. | |
| 5,348,706 A | 9/1994 | Abul-Haj et al. | |
| 5,349,328 A | 9/1994 | Lonzame | |
| 5,352,026 A | 10/1994 | Snook | |
| 5,416,777 A | 5/1995 | Kirkham | |
| 5,431,485 A | 7/1995 | Hayashi | |
| 5,492,391 A | 2/1996 | Snook | |
| 5,517,173 A | 5/1996 | Cha et al. | |
| 5,519,588 A | 5/1996 | Sobeck et al. | |
| 5,533,794 A | 7/1996 | Faison | |
| 5,557,698 A | 9/1996 | Gareis et al. | |
| 5,584,537 A | 12/1996 | Miansian | |
| 5,603,283 A | 2/1997 | Owen | |
| 5,613,012 A | 3/1997 | Hoffman et al. | |
| 5,615,277 A | 3/1997 | Hoffman | |
| 5,618,323 A | 4/1997 | Shearn et al. | |
| 5,626,057 A | 5/1997 | Nishigai et al. | |
| 5,635,903 A | 6/1997 | Koike et al. | |
| 5,637,933 A | 6/1997 | Rawlings et al. | |
| 5,641,193 A | 6/1997 | Zepnik et al. | |
| 5,660,243 A | 8/1997 | Anzalone et al. | |
| 5,694,259 A | 12/1997 | Brandin | |
| 5,702,150 A | 12/1997 | Reuter et al. | |
| 5,734,238 A | 3/1998 | Yanagisawa et al. | |
| 5,738,369 A | 4/1998 | Durrani | |
| 5,745,027 A | 4/1998 | Malville | |
| 5,770,797 A | 6/1998 | Lapohn | |
| 5,794,733 A | 8/1998 | Stosel et al. | |
| 5,802,922 A | 9/1998 | Kawai et al. | |
| 5,808,374 A | 9/1998 | Miller et al. | |
| 5,820,224 A | 10/1998 | Dimatteo, Jr. | |
| 5,821,466 A * | 10/1998 | Clark et al. | 174/113 R |
| 5,853,857 A | 12/1998 | Mahmood et al. | |
| 5,870,723 A | 2/1999 | Pare, Jr. et al. | |
| 5,883,334 A * | 3/1999 | Newmoyer et al. | 174/113 R |
| 5,896,778 A | 4/1999 | Murakami et al. | |
| 5,899,521 A | 5/1999 | Pfertner et al. | |
| 5,910,988 A | 6/1999 | Ballard | |
| 5,934,744 A | 8/1999 | Jergens et al. | |
| 5,941,105 A | 8/1999 | Macey | |
| D416,525 S | 11/1999 | Sacco et al. | |
| 5,988,238 A | 11/1999 | Palvolgyi | |
| 6,011,548 A | 1/2000 | Thacker | |
| 6,032,137 A | 2/2000 | Ballard | |
| 6,053,043 A | 4/2000 | Dannenberg et al. | |
| 6,056,075 A | 5/2000 | Kargilis | |
| 6,092,898 A | 7/2000 | De Juan, Jr. | |
| 6,116,700 A | 9/2000 | Herrera | |
| 6,178,917 B1 | 1/2001 | Jansa | |
| 6,182,807 B1 | 2/2001 | Saito et al. | |
| 6,198,244 B1 | 3/2001 | Hayden et al. | |
| 6,205,880 B1 | 3/2001 | Deidewig et al. | |
| D440,918 S | 4/2001 | Pfeiffer | |
| 6,212,989 B1 | 4/2001 | Beyer et al. | |
| 6,234,555 B1 | 5/2001 | Emmerich et al. | |
| 6,234,557 B1 | 5/2001 | Bae | |
| 6,253,131 B1 | 6/2001 | Quigley et al. | |
| 6,253,716 B1 | 7/2001 | Palmer et al. | |
| 6,262,982 B1 | 7/2001 | Donahue et al. | |
| 6,263,447 B1 | 7/2001 | French et al. | |
| 6,269,348 B1 | 7/2001 | Pare, Jr. et al. | |
| 6,282,658 B2 | 8/2001 | French et al. | |
| 6,302,228 B1 | 10/2001 | Cottereau et al. | |
| 6,308,205 B1 | 10/2001 | Carcerano et al. | |
| 6,315,326 B1 | 11/2001 | Muller et al. | |
| 6,321,339 B1 | 11/2001 | French et al. | |
| 6,322,158 B1 | 11/2001 | Herrera | |
| 6,357,563 B1 | 3/2002 | Hayford et al. | |
| 6,366,682 B1 | 4/2002 | Hoffman et al. | |
| 6,397,198 B1 | 5/2002 | Hoffman et al. | |
| 6,411,728 B1 | 6/2002 | Lee et al. | |
| 6,441,510 B1 | 8/2002 | Hein et al. | |
| 6,463,901 B1 | 10/2002 | Cuddihee et al. | |
| 6,479,973 B2 | 11/2002 | Saito et al. | |
| 6,514,136 B1 | 2/2003 | Hanaya et al. | |
| 6,525,998 B1 | 2/2003 | Taylor et al. | |
| D471,139 S | 3/2003 | Wyszogrod et al. | |
| 6,533,466 B1 * | 3/2003 | Smith | 385/75 |
| D481,337 S | 10/2003 | Hartono et al. | |
| 6,669,275 B2 | 12/2003 | Frasher et al. | |
| 6,679,215 B2 | 1/2004 | Benson et al. | |
| 6,693,523 B1 | 2/2004 | Abel et al. | |
| 6,718,842 B1 | 4/2004 | Bofias | |
| D492,629 S | 7/2004 | Hartono et al. | |
| 6,780,047 B1 | 8/2004 | Laidty | |
| 6,782,862 B2 | 8/2004 | Homi | |
| 6,837,602 B1 | 1/2005 | Lee | |
| 6,843,115 B2 | 1/2005 | Rutherford | |
| 6,882,917 B2 | 4/2005 | Pillar et al. | |

| | | |
|---|---|---|
| 6,889,516 B2 | 5/2005 | Sasaki et al. |
| 6,942,277 B2 | 9/2005 | Rangnekar et al. |
| 7,004,787 B2 * | 2/2006 | Milan ............... 439/502 |
| 7,055,883 B2 | 6/2006 | Tokutomi et al. |
| 7,059,289 B2 | 6/2006 | Cunningham et al. |
| 7,066,630 B1 | 6/2006 | Venkatram |
| 7,068,158 B2 | 6/2006 | Komatsu et al. |
| 7,097,233 B2 | 8/2006 | Sogame et al. |
| 7,140,667 B2 | 11/2006 | Steinhauser et al. |
| 7,146,129 B2 | 12/2006 | Bostrom et al. |
| 7,159,486 B2 | 1/2007 | Thoreson et al. |
| 7,165,871 B2 | 1/2007 | Takeda et al. |
| D537,393 S | 2/2007 | Chanteloup |
| 7,206,672 B2 | 4/2007 | Mueller |
| 7,257,397 B2 | 8/2007 | Shamoon et al. |
| D551,604 S | 9/2007 | Kapffenstein |
| 7,266,435 B2 | 9/2007 | Wang et al. |
| 7,271,708 B2 | 9/2007 | Nakatani et al. |
| D551,971 S | 10/2007 | Hardwick |
| D559,159 S | 1/2008 | Kazyaka |
| D562,738 S | 2/2008 | Young |
| 7,341,278 B2 | 3/2008 | Queveau et al. |
| 7,350,273 B1 | 4/2008 | Skipper |
| 7,375,285 B2 * | 5/2008 | Chiang ............... 174/113 R |
| D571,268 S | 6/2008 | Hoffman |
| 7,387,414 B2 | 6/2008 | Helms et al. |
| 7,392,122 B2 | 6/2008 | Pillar et al. |
| D574,661 S | 8/2008 | Logan |
| D575,581 S | 8/2008 | Harris |
| D580,457 S | 11/2008 | Bender |
| D581,843 S | 12/2008 | Kluck |
| 7,483,952 B2 | 1/2009 | Light et al. |
| 7,494,178 B2 | 2/2009 | Nygaard |
| 7,523,683 B2 | 4/2009 | Jackson |
| D594,796 S | 6/2009 | Ballard et al. |
| 7,540,638 B2 | 6/2009 | Dassanayake et al. |
| 7,544,886 B2 * | 6/2009 | Detian et al. ............... 174/36 |
| 7,547,077 B2 | 6/2009 | Melberg et al. |
| 7,585,031 B2 | 9/2009 | White et al. |
| D606,467 S | 12/2009 | Ballard et al. |
| 7,636,985 B2 | 12/2009 | Greenbank |
| 7,690,460 B2 | 4/2010 | Sakitani et al. |
| 7,703,961 B2 | 4/2010 | Yatsuda et al. |
| 7,725,732 B1 | 5/2010 | Ballard |
| 7,740,501 B2 * | 6/2010 | Ballard et al. ............... 439/578 |
| 7,747,739 B2 | 6/2010 | Bridges et al. |
| 7,786,851 B2 | 8/2010 | Drew et al. |
| 7,866,859 B2 | 1/2011 | Suzuki et al. |
| 2001/0034671 A1 | 10/2001 | Luke et al. |
| 2002/0034301 A1 | 3/2002 | Andersson |
| 2002/0073507 A1 | 6/2002 | Presley |
| 2002/0082750 A1 | 6/2002 | Lamke et al. |
| 2002/0180579 A1 | 12/2002 | Nagaoka et al. |
| 2003/0011546 A1 | 1/2003 | Obata et al. |
| 2003/0015909 A1 | 1/2003 | Meek, Jr. |
| 2003/0206418 A1 | 11/2003 | Strazzanti |
| 2003/0225693 A1 | 12/2003 | Ballard et al. |
| 2004/0002794 A1 | 1/2004 | Pillar et al. |
| 2004/0019413 A1 | 1/2004 | Bonilla et al. |
| 2004/0043753 A1 | 3/2004 | Wake et al. |
| 2004/0075537 A1 | 4/2004 | Quigley et al. |
| 2004/0129197 A1 | 7/2004 | Nakagawa et al. |
| 2004/0155789 A1 | 8/2004 | Crews |
| 2004/0158723 A1 | 8/2004 | Root |
| 2004/0202006 A1 | 10/2004 | Pien |
| 2004/0202007 A1 | 10/2004 | Yagi et al. |
| 2005/0012607 A1 | 1/2005 | Sumiya et al. |
| 2005/0021190 A1 | 1/2005 | Worrell et al. |
| 2005/0105296 A1 | 5/2005 | French |
| 2005/0107928 A1 | 5/2005 | Mueller |
| 2005/0128751 A1 | 6/2005 | Roberge et al. |
| 2005/0140129 A1 | 6/2005 | Miki et al. |
| 2005/0141225 A1 | 6/2005 | Striebel |
| 2005/0155043 A1 | 7/2005 | Schulz et al. |
| 2005/0168071 A1 | 8/2005 | Durbin et al. |
| 2005/0190045 A1 | 9/2005 | Lesesky et al. |
| 2005/0234622 A1 | 10/2005 | Pillar et al. |
| 2005/0257613 A1 | 11/2005 | Spencer et al. |
| 2005/0264268 A1 | 12/2005 | Ueno |
| 2005/0280253 A1 | 12/2005 | Queveau et al. |
| 2006/0044825 A1 | 3/2006 | Sa |
| 2006/0053281 A1 | 3/2006 | Andersson |
| 2006/0066584 A1 | 3/2006 | Barkan |
| 2006/0097577 A1 | 5/2006 | Kato et al. |
| 2006/0097852 A1 | 5/2006 | Lammers et al. |
| 2006/0107784 A1 | 5/2006 | Bostic et al. |
| 2006/0162485 A1 | 7/2006 | Leng et al. |
| 2006/0187670 A1 | 8/2006 | Dalton et al. |
| 2006/0200781 A1 | 9/2006 | Obradovich |
| 2006/0243191 A1 | 11/2006 | Verdouw |
| 2006/0256572 A1 | 11/2006 | Lin |
| 2006/0266273 A1 | 11/2006 | Westberg et al. |
| 2007/0001830 A1 | 1/2007 | Dagci et al. |
| 2007/0011227 A1 | 1/2007 | Johnson |
| 2007/0024117 A1 | 2/2007 | Boenker, IV et al. |
| 2007/0030137 A1 | 2/2007 | Masters et al. |
| 2007/0077058 A1 | 4/2007 | Kontani |
| 2007/0096546 A1 | 5/2007 | Thomas et al. |
| 2007/0137367 A1 | 6/2007 | Papa et al. |
| 2007/0153406 A1 | 7/2007 | Matsumoto |
| 2007/0247291 A1 | 10/2007 | Masuda et al. |
| 2008/0002420 A1 | 1/2008 | Lambert et al. |
| 2008/0007961 A1 | 1/2008 | Mochizuki et al. |
| 2008/0031004 A1 | 2/2008 | Chu |
| 2008/0034209 A1 | 2/2008 | Dickinson et al. |
| 2008/0042822 A1 | 2/2008 | Wang |
| 2008/0080203 A1 | 4/2008 | Neufeglise |
| 2008/0157593 A1 | 7/2008 | Bax et al. |
| 2008/0173127 A1 | 7/2008 | Ackert et al. |
| 2008/0222844 A1 | 9/2008 | Broadhead et al. |
| 2009/0011639 A1 | 1/2009 | Ballard et al. |
| 2009/0016216 A1 | 1/2009 | Ballard et al. |
| 2009/0040029 A1 | 2/2009 | Bridges et al. |
| 2009/0051522 A1 | 2/2009 | Perkins |
| 2009/0091291 A1 | 4/2009 | Woody et al. |
| 2009/0126827 A1 | 5/2009 | Guendouz et al. |
| 2009/0161377 A1 | 6/2009 | Helms et al. |
| 2009/0200988 A1 | 8/2009 | Bridges et al. |
| 2009/0207602 A1 | 8/2009 | Reed et al. |
| 2009/0223318 A1 | 9/2009 | Ballard |
| 2009/0223437 A1 | 9/2009 | Ballard |
| 2009/0223438 A1 | 9/2009 | Ballard |
| 2009/0223757 A1 | 9/2009 | Ballard |
| 2009/0223789 A1 | 9/2009 | Ballard |
| 2009/0224895 A1 | 9/2009 | Ballard |
| 2009/0267405 A1 | 10/2009 | Ballard |
| 2009/0271949 A1 | 11/2009 | Sprague et al. |
| 2009/0272313 A1 | 11/2009 | Ballard et al. |
| 2009/0272589 A1 | 11/2009 | Ballard |
| 2009/0273170 A1 | 11/2009 | Ballard et al. |
| 2009/0273208 A1 | 11/2009 | Ballard et al. |
| 2009/0273282 A1 | 11/2009 | Ballard et al. |
| 2009/0273942 A1 | 11/2009 | Ballard et al. |
| 2009/0274416 A1 | 11/2009 | Ballard |
| 2009/0277707 A1 | 11/2009 | Ballard |
| 2009/0289062 A1 | 11/2009 | Ballard |
| 2009/0289757 A1 | 11/2009 | Ballard |
| 2010/0079997 A1 | 4/2010 | Morikawa et al. |
| 2010/0082277 A1 | 4/2010 | Ballard |
| 2010/0128479 A1 | 5/2010 | Biebl et al. |
| 2010/0301631 A1 | 12/2010 | Scott et al. |

FOREIGN PATENT DOCUMENTS

| | | |
|---|---|---|
| DE | 10311396 A1 | 9/2004 |
| DE | 102004053238 A1 | 5/2006 |
| EP | 0507225 A | 10/1992 |
| EP | 1429348 A | 6/2004 |
| EP | 1493630 | 1/2005 |
| GB | 462033 A | 3/1937 |
| GB | 2203483 A | 10/1988 |
| JP | 05-053594 A | 3/1993 |
| JP | 5-169981 A | 7/1993 |
| JP | 07-302093 A | 11/1995 |
| JP | 2000-357421 A | 12/2000 |
| JP | 2002-313144 A | 10/2002 |
| JP | 2003123176 A | 4/2003 |
| JP | 2007-010810 A | 1/2007 |
| WO | 2005103627 A2 | 11/2005 |

OTHER PUBLICATIONS

PCT: International Preliminary Report on Patentability of PCT/US2009/059073 (related application); Apr. 14, 2011.
Ethernet over twisted pair; Wikipedia, the free encyclopedia; Jun. 3, 2008; pp. 1-3; available at http://en.wikipedia.org/wiki/Ethernet_over_twisted_pair.
PCT: International Search Report and Written Opinion of PCT/US2009/059073 (related application); Jan. 22, 2010; 7 pgs.
PCT: International Search Report and Written Opinion of PCT/US2009/045063 (related application); Aug. 12, 2009; 7 pgs.
PCT: International Search Report and Written Opinion of PCT/US2009/043649 (related application); Aug. 10, 2009; 8 pgs.
PCT: International Search Report and Written Opinion of PCT/US2009/036322 (related application); Jun. 11, 2009; 8 pgs.
PCT: International Search Report and Written Opinion of PCT/US2009/036234 (related application); Dec. 21, 2009; 6 pgs.
PCT: International Search Report and Written Opinion of PCT/US2009/036190 (related application); Jul. 15, 2009; 8 pgs.
PCT: International Search Report and Written Opinion of PCT/US2009/036078 (related application); Apr. 15, 2009; 7 pgs.
PCT: International Search Report and Written Opinion of PCT/US2009/036073 (related application); May 16, 2009; 8 pgs.
PCT: International Search Report and Written Opinion of PCT/US2009/036001 (related application); Apr. 14, 2009; 12 pgs.
PCT: International Search Report and Written Opinion of PCT/US2009/035850 (related application); Apr. 15, 2009; 9 pgs.
PCT: International Search Report and Written Opinion of PCT/US2009/035844 (related application); Apr. 23, 2009; 7 pgs.
PCT: International Search Report and Written Opinion of PCT/US2009/035715 (related application); Apr. 29, 2009; 8 pgs.
PCT: International Search Report and Written Opinion of PCT/US2009/035626 (related application); Jun. 3, 2009; 7 pgs.
PCT: International Search Report and Written Opinion of PCT/US2009/035625 (related application); May 25, 2009; 9 pgs.
PCT: International Search Report and Written Opinion of PCT/US2009/035615 (related application); Jul. 14, 2009; 7 pgs.
PCT: International Search Report and Written Opinion of PCT/US2009/035614 (related application); Aug. 21, 2009; 10 pgs.
PCT: International Preliminary Report on Patentability of PCT/IB2008/002056 (related application); Dec. 7, 2009.
PCT: International Preliminary Report on Patentability of PCT/IB2008/002060 (related application); Dec. 7, 2009.
PCT: International Search Report and Written Opinion of PCT/IB2008/002056 (related application); Jan. 7, 2009; 9 pgs.
PCT: International Search Report and Written Opinion of PCT/IB2008/002060 (related application); Feb. 16, 2009; 12 pgs.
Vanderwerp, Dave, "2011 Dodge Circuit EV—First Drive Review." Jun. 2009; pp. 1-4; available at http://www.caranddriver.com/reviews/car/09q2/2011_dodge_circuit_ev-first_drive_review.
PCT: International Preliminary Report on Patentability of PCT/US2009/045063 (related application); Dec. 2, 2010.
PCT: International Preliminary Report on Patentability of PCT/US2009/043649 (related application); Nov. 25, 2010.
PCT: International Preliminary Report on Patentability of PCT/US2009/036322 (related application); Sep. 16, 2010.
PCT: International Preliminary Report on Patentability of PCT/US2009/036234 (related application); Sep. 7, 2010.
PCT: International Preliminary Report on Patentability of PCT/US2009/035844 (related application); Sep. 7, 2010.
PCT: International Preliminary Report on Patentability of PCT/US2009/036073 (related application); Sep. 7, 2010.
PCT: International Preliminary Report on Patentability of PCT/US2009/035850 (related application); Sep. 7, 2010.
PCT: International Preliminary Report on Patentability of PCT/US2009/036190 (related application); Sep. 7, 2010.
PCT: International Preliminary Report on Patentability of PCT/US2009/035626 (related application); Sep. 7, 2010.
PCT: International Preliminary Report on Patentability of PCT/US2009/035614 (related application); Sep. 7, 2010.
PCT: International Preliminary Report on Patentability of PCT/US2009/035715 (related application); Sep. 7, 2010.
PCT: International Preliminary Report on Patentability of PCT/US2009/036078 (related application); Sep. 7, 2010.
PCT: International Preliminary Report on Patentability of PCT/US2010/041231 (related application); Jan. 19, 2012; 6 pages.
PCT: International Preliminary Report on Patentability of PCT/US2009/036309 (related application); Feb. 23, 2012; 5 pages.
PCT: International Search Report and Written Opinion of PCT/US2009/035624 (related application); Feb. 16, 2012; 9 pgs.
PCT: International Search Report and Written Opinion of PCT/US2011/041489 (counterpart application); Feb. 9, 2012; 8 pgs.

* cited by examiner

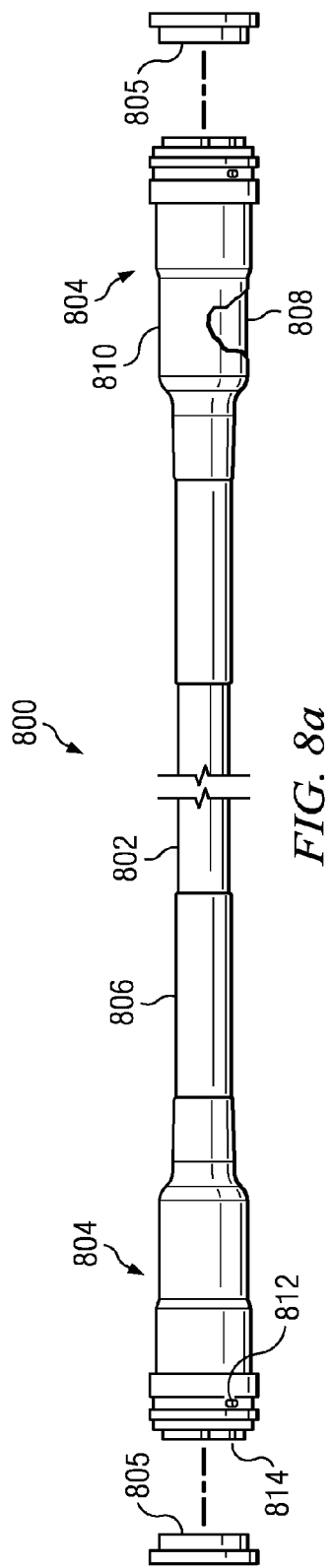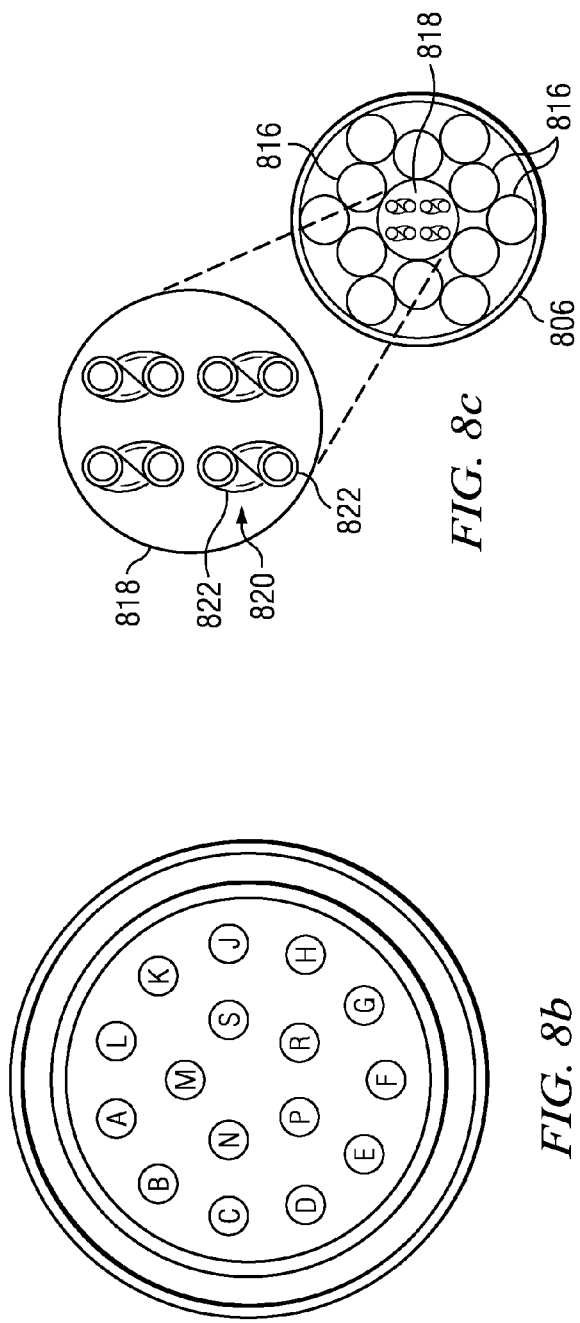
FIG. 8a
FIG. 8b
FIG. 8c

HYBRID CABLE FOR CONVEYING DATA AND POWER

CROSS-REFERENCE TO RELATED APPLICATIONS

This application is a continuation-in-part of U.S. patent application Ser. No. 12/134,454, filed Jun. 6, 2008, and entitled HYBRID CABLE FOR CONVEYING DATA AND POWER, published as U.S. Patent Application Publication No. US 2009/0011639, now U.S. Pat. No. 7,740,501, issued on Jun. 22, 2010, which claims benefit of U.S. application Ser. No. 60/933,358, filed Jun. 6, 2007, and entitled VIRTUAL ELECTRICAL AND ELECTRONIC DEVICE INTERFACE AND MANAGEMENT SYSTEM.

U.S. Patent Application Publication No. U.S. 2009/0011639 and U.S. Pat. No. 7,740,501 are incorporated by reference herein.

TECHNICAL FIELD

The invention relates to hybrid cables having a first set of electrical conductors for carrying digital signals and a second set of electrical conductors for carrying AC or DC operating power between electrical or electronic devices and, in particular, to hybrid cables for use in carrying digital signals and operating power between spaced-apart devices comprising the electrical system of a vehicle or other artificial structure.

BACKGROUND

Providing a unified network for handling both digital communications and electrical power distribution across the electrical system of a vehicle or other artificial structure is the goal of many developers. The character of the physical connectivity elements connecting the various electrical/electronic devices comprising the networked electrical system is of great interest. Preferably, the physical connectivity elements will facilitate simplified construction, maintenance and modification of the networked electrical system with respect to both the data communications and power distribution aspects.

Conventional vehicle electrical systems, for example, those used in production automobiles, typically distribute electrical power using wiring harnesses featuring dedicated wire circuits running from each discrete electrical/electronic device to its associated power source and/or control switch. Further, most conventional vehicle wiring systems utilize physically separate power conductors and (when needed) signal conductors. Such conventional wiring systems are typically model-specific, feature limited (if any) networking capabilities, and offer no overall control and data collection functions. Thus, such wiring systems are not readily amenable to integrated network communication and power distribution. Furthermore, once production has started, modifying a wiring system utilizing a fixed wiring harness can be very difficult and expensive.

Another drawback of conventional vehicle electrical systems is the widespread practice (especially common in the automotive domain) of using the vehicle's chassis or frame as a common neutral (i.e., ground) connection for electrical circuits. This practice dates back to the early days of automotive development, and has likely been perpetuated for reasons of cost-containment. However, using a vehicle's frame or chassis as a ground or neutral connection may cause problems. First, ground connections to the vehicle's frame or chassis tend to become loose over the life of a vehicle. Such loose ground connections result in voltage drops across the degraded connection, thus interfering with the power distribution aspect of the system. Further, loose ground connections may also generate electromagnetic noise, which may be picked up as "static" by other subsystems in the vehicle, such as the vehicle's radio or sound system. Such electromagnetic noise may also interfere with the operation of network communications if a data network is present on the vehicle.

To the extent that microcontrollers and other electrical/electronic components are currently interconnected in vehicles, the interconnection is typically done via either device-specific local busses (e.g., across an instrument panel), or through proprietary low-rate busses such as those utilizing the Controller Area Network (CAN) protocol. Such interconnections are expensive to engineer and typically rely on proprietary architecture and software. Further, they are not generally capable of supporting integrated diagnostics, fault detection and maintenance related data collection due, at least in part, to limited data transmission rates.

In order to better integrate the numerous electrical devices, sensors and controls used in modern vehicles into a network, higher data transmission rates are required. Better data transmission rates may also allow individual devices to be sequentially connected, (e.g., "daisy chained") together for high level control and monitoring with a host computer. Also, the elimination of electromagnetic noise is important in order to achieve the desired data transmission rates.

Although the high-speed networking of computers is well known using standard networking physical connectivity methods such as "Ethernet over twisted pair," including the widely used 10Base-T, 100Base-T and 1000Base-T (Gigabit Ethernet) methods, these physical connectivity solutions are inadequate for networking the majority of electrical/electronic devices comprising the electrical system of vehicles, e.g., production automobiles. This is because they generally cannot fulfill the power distribution aspect. For example, the Category 5, 5e and 6 cable typically used for 10Base-T, 100Base-T and 1000Base-T physical connectivity has inherently limited electrical power capacity that is insufficient to reliably handle high-current devices found in vehicles, e.g., automotive DC electric motors, electromagnetic clutches, solenoids, lighting, etc. Even enhanced power-delivery schemes such as Power Over Ethernet (POE) cannot typically supply sufficient power for vehicle-wide networking of the electrical system.

Thus, there exists a need for a hybrid cable that provides physical connectivity in a networked electrical system and fulfills both the data communications aspect and the power distribution aspect of the networked system.

SUMMARY

In one aspect thereof, a hybrid cable includes a signal conducting core having at least one twisted pair of signal conductors. First and second braided metallic power conductors are circumferentially disposed around the signal conductors with an insulating layer disposed between the power conductors. An outer insulating cover is disposed around the first and second braided metallic power conducting layers and core. A first connector disposed on an end of the cable includes one of a connecting pin or receptacle having a contact for each of the signal conductors and a power contact connected to each of the braided metallic power conductors. In one variation, the hybrid cable includes two twisted pairs of signal conductors and can convey up to 10 Mbits/sec or up to 100 Mbits/sec of data. In another variation, the hybrid cable includes four twisted pairs of signal conductors that can convey up to 1000 Mbits/sec of data. The signal conducting core may include one of an insulating material or strengthening members disposed inside the first power conductor and wherein the twisted pair signal conductors are disposed in the core. The hybrid cable may further include a second connector disposed on a second end of the cable wherein the first braided power conductor, second braided power conductor and twisted pair signal conductor each extend continuously from the first connector to the second connector.

In another variation, a hybrid cable includes at least one twisted pair of signal conductors with a metallic shield disposed around the signal conductors. First and second metallic power conductors are disposed substantially parallel to the signal conductors with an outer insulating cover disposed around the signal conductors, metallic shield and the power conductors. A connector disposed on a first end of the cable includes one of a connecting pin or receptacle for each of the signal conductors and contact connected to each of the power conducting layers. In one variation, the hybrid cable includes two twisted pairs of signal conductors wherein the signal conductors can convey up to 10 Mbits/sec of data. In another variation, the hybrid cable includes four twisted pairs of signal conductors and wherein the signal conductors can convey up to 1000 Mbits/sec of data. The cable may include a second connector disposed on a second end of the cable wherein the first metallic power conductor, second metallic power conductor and twisted pair signal conductor each extend continuously from the first connector to the second connector.

In another aspect, a vehicle having an electrical system including electrically operated sensors and electrically powered devices includes at least one hybrid cable having signal conductors for conveying data and power conductors for conducting power wherein the signal conductors can convey up to 10 Mbits/sec of data. An outer cover is disposed over the signal conductors and power conductors and a plurality of electrically powered devices are sequentially connected by means of the hybrid cable.

BRIEF DESCRIPTION OF THE DRAWINGS

For a more complete understanding, reference is now made to the following description taken in conjunction with the accompanying Drawings in which:

FIG. 2b is an end view of a connector for use with the cable of FIG. 2a;

FIG. 8a is a perspective view of an alternate hybrid cable according to the disclosure;

FIG. 8b is a schematic representation of the wire entry configuration of the connector portion of the hybrid cable of FIG. 8a;

FIG. 8c is a partial cross-section of cable portion of the hybrid cable of FIG. 8a;

FIG. 8d is a partial cross-section representing alternate configurations of cable portion of the hybrid cable of FIG. 8a;

FIG. 8e is a wiring schematic illustrating one possible arrangement of the connection arrangement of power and signal conductors of the hybrid cable of FIG. 8a;

FIG. 9b is a schematic illustration of the wire entry configuration of the first connector portion of the hybrid bulkhead cable of FIG. 9a;

FIG. 9c is a partial cross-section of the cable portion of the hybrid bulkhead cable of FIG. 9a;

FIG. 9d is a wire entry schematic illustrating the pin connection configuration of the signal conductors in first connector portion of the hybrid bulkhead cable of FIG. 9a.

DETAILED DESCRIPTION

Figure 1A:
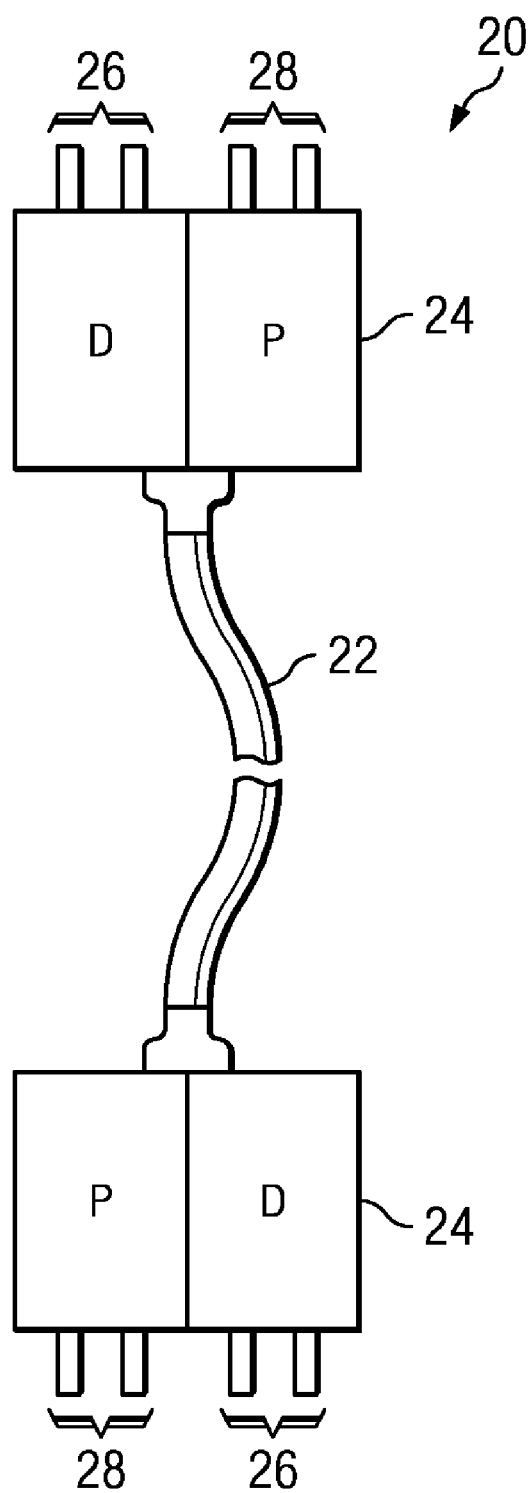
FIG. 1a is a schematic view of a hybrid cable in accordance with the disclosure.

Referring now to the drawings, wherein like reference numbers are used herein to designate like elements throughout, the various views and embodiments of a hybrid cable for conveying data and power are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1a, there is illustrated a schematic view of a hybrid cable 20 adapted for carrying both digital signals and electrical power across the networked electrical system of a vehicle or other artificial structure in accordance with the disclosure. For purposes of this application, the term "vehicle" may refer to any movable artificial structure including, but not limited to, automobiles, trucks, motorcycles, trains, light-rail vehicles, monorails, aircraft, helicopters, boats, ships, submarines and spacecraft. The term "other artificial structures" may refer to non-movable artificial structures including, but not limited to office buildings, commercial buildings, warehouses, residential multi-family buildings and residential single family homes.

The hybrid cable 20 includes a cable portion 22 including a first set of internal conductors (e.g., conductors 114 in FIG. 2a) for carrying digital data and a second set of internal conductors (e.g., conductors 104, 108 of FIG. 2a) for carrying electrical power (electrical current and voltage). A connector member 24 is provided at each end of the cable portion 22. Each connector member 24 includes a plurality of first electrical terminals 26 mounted thereon that are operatively connected to each of the first set of internal conductors and a plurality of second electrical terminals 28 mounted thereon that are operatively connected to each of the second set of internal conductors. It will be appreciated that the first electrical terminals 26 and second electrical terminals 28 on one connector member 24 are in continuous electrical contact with the respective first and second electrical terminals on the other connector member, thus allowing the cable 20 to carry data signals from terminals 26 on one end to terminals 26 on the other end, and to carry electrical power from terminals 28 on one end to terminals 28 on the other end. In some embodiments, the hybrid cable 20 may include a water-resistant connector (not shown) that meets a particular ingress protection standard (e.g., qualifies as an IP-67 or similar level protection seal) that provides a rugged interface to the connected network device.

The electrical power carried by the power conductors and power terminals 28 of hybrid cable 20 may be in the form of either DC current or AC current at a desired voltage or voltage range. For example, some hybrid cable implementations may only need to support twelve volt DC power applications, while other implementations may require higher voltages, e.g., twenty-four volts DC, forty-eight volts DC, or 110/220 VAC at 50/60 Hz, etc. In some embodiments, the voltage/power rating of the hybrid cable is identified by the use of color coded cable portions 22 or connector members 24 and/or differently configured and keyed connector members 24 and/or terminals 26, 28 to eliminate the possibility of connecting equipment that is not power compatible.

As described further below, in some embodiments the data conductors and data terminals 26 of the hybrid cable 20 are configured to support one or more high-speed network communication protocols. For example, the hybrid cable 20 may support various levels of Ethernet (e.g., 10 baseT, 100 baseT, and 1000 baseT). Other embodiments may support protocols such as the Universal Serial Bus (USB) protocol, Firewire, CAN, and Flexray in addition to or as alternatives of Ethernet. In still other embodiments, the connector members 24 may be manufactured to aerospace standards from a corrosion resistant material with a temperature rating suitable for harsh application environments. In still further embodiments, the cable portion 22 may have a matching jacket and may be jacketed with shielding sufficient to maintain crosstalk or other noise at a level that will not interfere with network data traffic.

In some versions, the hybrid cable 20 integrates neutral wiring into a single cable concept to prevent ground loops, reduce noise, and improve reliability. As previously discussed, cars, boats, airplanes, and similar environments have traditionally used the vehicle's metal chassis as a return path for the DC operating voltage. This is done mainly as a cost saving measure, but can lead to downstream failures. For example, the electrical connections to ground can be at different galvanic potentials depending on the finish and composition of the materials used, and this can accelerate corrosion in an already hostile operational environment. The electrical resistance of circuits can vary over time, leading to varying voltages running through the same common ground, which often induces electrical noise between circuit paths. Accordingly, using the hybrid cable 20 as disclosed herein minimizes or eliminates these problems due to the cable's configuration as a protected ground wire with gas tight, high reliability connections designed to isolate the electrical circuit return path and minimize or eliminate induced electrical cross talk.

Figure 1B:
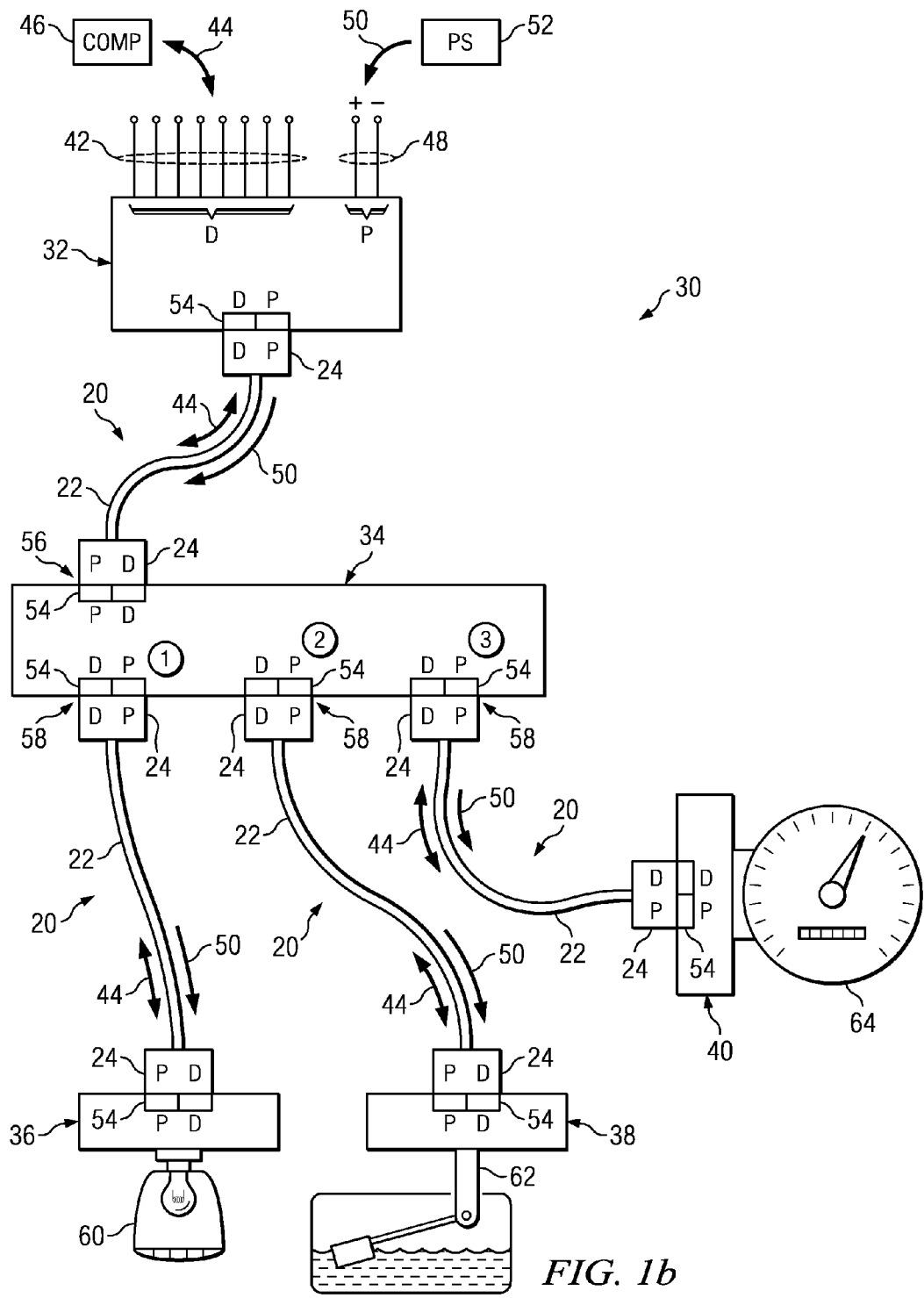
FIG. 1b is a schematic view of the hybrid cables of FIG. 1a providing physical connectivity in the networked electrical system of a vehicle.

Referring now to FIG. 1*b*, there is illustrated a schematic view of hybrid cables 20 providing physical connectivity in a networked electrical system of a vehicle. In this embodiment, electrical system 30 includes a network controller 32, a hybrid data/power switch 34, and three device modules 36, 38 and 40. The controller 32 has a plurality of data terminals 42 for two-way communication with a computer 46 or other control device via digital data signals 44. The controller 32 also includes a plurality of power terminals 48 for receiving electrical power 50 from a power source 52. The controller further includes a cable interface 54 including some terminals for transmitting/receiving digital data signals 44 and other terminals for sending electrical power 50. The switch 34 includes an input port 56 and three output ports 58, each port including a cable interface 54 including some terminals for transmitting/receiving digital data signals 44 and other terminals for receiving (in the case of the input port) or sending (in the case of the output ports) electrical power 50. Each device module 36, 38, 40 is operatively connected to an electrical/electronic device, in this case a light 60, gas gauge sender 62 and a speed indicator 64, respectively, to provide a low-level interface allowing the network controller 32 to monitor and operate the devices 60, 62 and 64.

Referring still to FIG. 1*b*, hybrid cables 20 are connected between the cable interfaces 54 of each network component 32, 34, 36, 38 and 40. The physical configuration of the cable interface 54 is selected to interfit with the end members 24 of the hybrid cable 20 so as to provide electrical continuity between the appropriate data or power terminals of the devices at each end of the cable 20. This provides physical connectivity across the network for both the digital data communication aspect and the power distribution aspects of the network, i.e., allowing data communication signals 44 to pass back and forth from the controller 32, through the switch 34, to the device modules 36, 38 and 40 (and back) while simultaneously allowing electrical power to be distributed from the controller, through the switch, to the device modules and ultimately supplied to device 60, 62 and 64 for their operation.

Figure 2A:
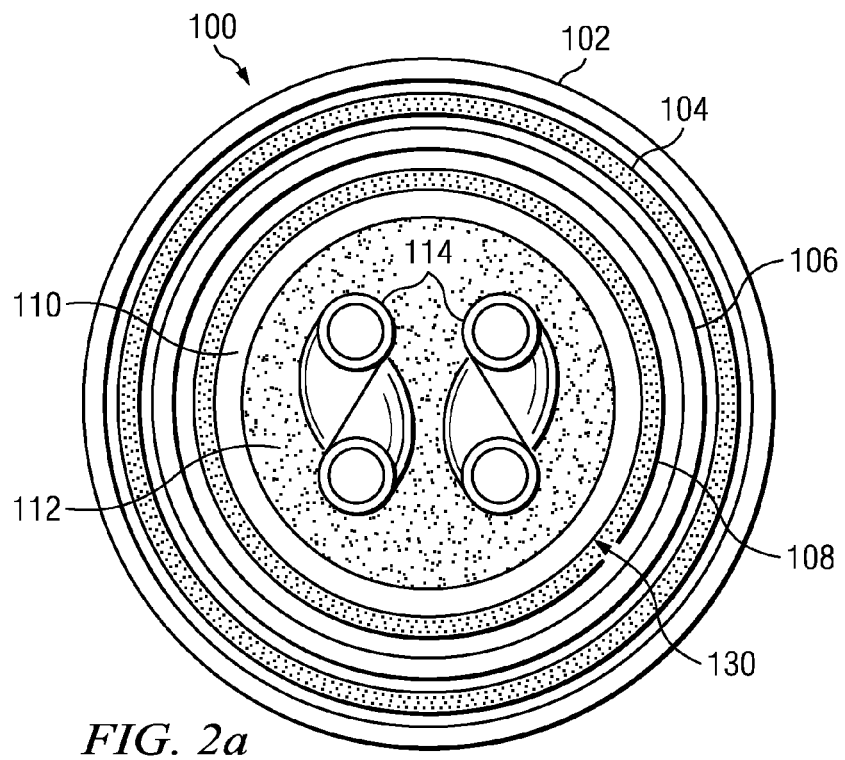
FIG. 2a is a cross-section of a hybrid cable according to the disclosure.

Referring now to FIG. 2*a*, there is illustrated a cross-sectional view of the cable portion of another hybrid cable according to the disclosure. As illustrated, cable 100 includes an outer covering 102 which may be formed of a suitable plastic such as polyethylene, polyvinyl chloride or Teflon®. A first power conductor 104 is disposed inside cover 102. In one variation, the power conductor 104 is a braided metallic sheath that extends around an internal circumference of cable 100 beneath cover 102. An insulating layer 106 is disposed beneath first braided conductor 104. A second power conductor 108 is disposed axially beneath insulating layer 106. In one variation, second power conductor 108 comprises a second braided metallic sheath that extends around an internal circumference of cable 100 beneath insulating layer 106. A core 130 is positioned inside of second power conductor 108. In one variation, core 130 includes a cover 110, which may be formed from a suitable plastic. The use of two power conductors eliminates the need for grounding electrically powered devices to the vehicle's frame or body since one of power conductors 104, 108 will provide a neutral or ground connection.

Disposed in core 130 are twisted pair signal conductors 114. In the illustrated embodiment, two twisted pair signal conductors 114 are illustrated; however, in other variations a single twisted pair signal conductor may be used or more than two twisted pair signal conductors may be used. The twisted pair configuration is used for the purpose of reducing cross talk that may occur when pulsing direct current goes through the conductors, creating electric-magnetic induction effects. Two twisted pairs of signal conductors are capable of conveying 10 Mbits/sec. or 100 Mbits/sec. of data using 10BASE-T or 100Base-T physical connectivity. Four twisted pair of signal conductors may be used to convey up to 1000 Mbits/sec with 1000Base-T physical connectivity. In one variation, an insulating material 112 is disposed around twisted pair signal conductors 114 in core 130.

As used herein, the term "power conductor" refers to a conductor that conveys operating current to devices such as fan motors, windshield wiper motors, vehicle headlights, tail lights, turn signals and similar electrically powered devices. Thus, vehicle power conductors may carry, for example 1 amp or more of electrical current. Alternatively, the term "signal conductor" refers to conductors that use small electrical signals to convey data, such as device addresses, sensor readings and control signals. Currents flowing through signal conductors are typically in the milliamp range. Consequently the current flowing through a power conductor may be on the order of 1000 to 100,000 times greater that the current flowing through a signal conductor.

Figure 2B:
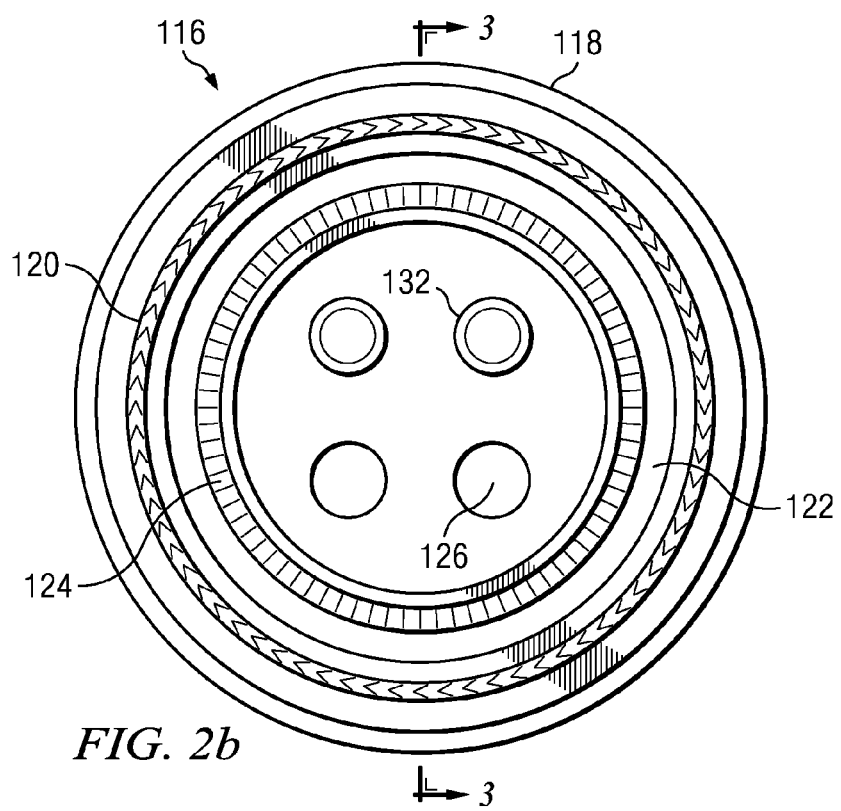

FIG. 2b is an end view of a connector for use with cable 100. Connector 116 includes a housing 118 that may be formed from a suitable non-conductive material. As illustrated, a circular metallic blade or prong 120 is mounted in housing 118. Blade 120 is connected to first power conductor 104 and provides a path for current flow through the power conductor. Blade 120 is configured for insertion into a mating or complementary recess in a second connecter or receptacle. In the illustrated embodiment, blade 120 extends continuously around an internal circumference of housing 118. In other variations, blade 120 may extend partially around the internal circumference of housing 118, or may be divided into a plurality of individual contacts positioned at spaced-apart intervals.

An annular recess 122 is formed in housing 118 radially inward of blade 120. A contact 124 mounted in recess 122 is connected to second power conductor 108. Contact 124 provides an electrical contact for connecting second power conductor 108 to a mating connector. In the illustrated embodiment, a single circular contact 124 extends around the circumference defined by annular recess 122. In other variations, a single contact 124 that extends only partially around the circumference of recess 122 may be utilized or a plurality of contacts 124 may be spaced apart at intervals around the circumference of recess 122. Contact 124 is connected to second power conductor 108.

Figure 3:
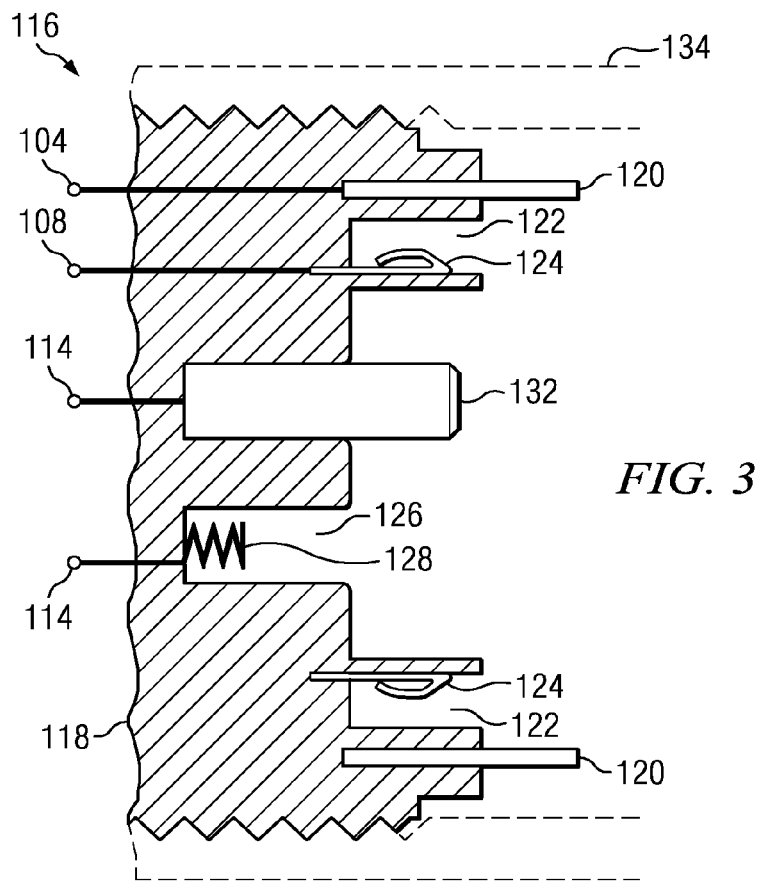
FIG. 3 is a length-wise sectional view of the connector of FIG. 2b taken along line 3-3 of FIG. 2b.

FIG. 3 is a length wise sectional view of connector 116 taken along line 3-3 of FIG. 2b. In one variation, an internally threaded metal collar 134 may be used over housing 118 to couple connector 116 to a mating connector and to provide additional protection to the connector. As illustrated, connector pins 132 and pin receptacles 126 are positioned radially inside annular recess 122 in connector 116. Contacts 128 are positioned inside pin receptacles 126. Pins 132 and contacts 128 provide a signal path through connector 116. A pin 132 and contact 128 may be each connected to a conductor of twisted pair 114. In one variation, a pin 132 and receptacle 126 may be provided for each twisted pair signal conductors 114 in cable 100.

As will be appreciated, hybrid cable assembly 100 provides an integrated means of conveying power and data. Power is conveyed over power conductors 104 and 108, while data and/or control signals are conveyed over twisted pair conductors 114. Power conductors 104 and 108 shield twisted pair signal conductors 114 from electro-magnetic effects, enhancing data transmission.

Figure 4:
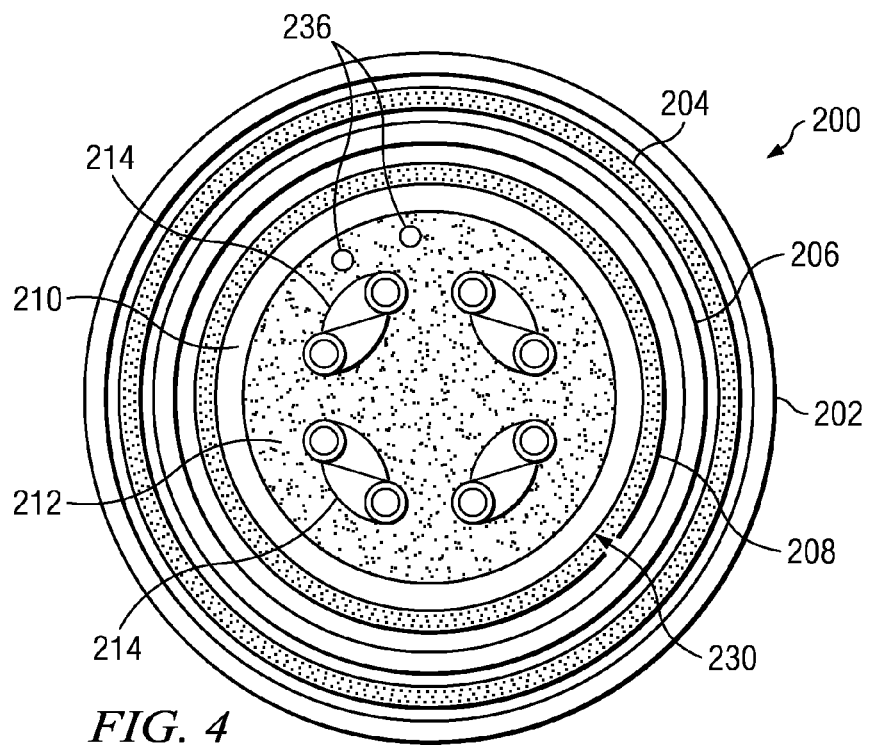
FIG. 4 is a cross-sectional view of a first alternate embodiment of a hybrid cable according to the disclosure.
Figure 5:
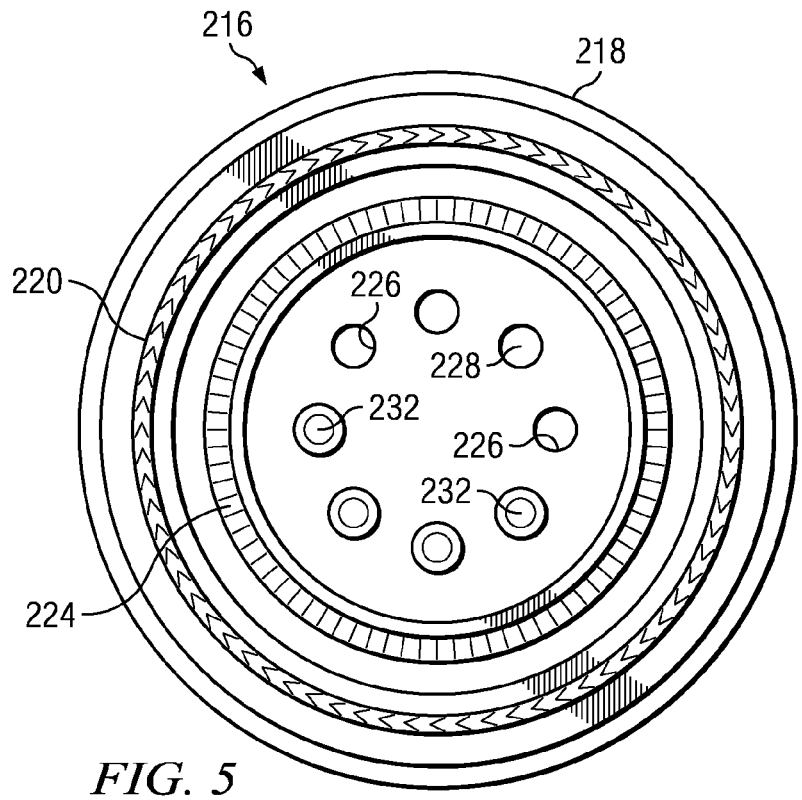
FIG. 5 is an end view of a connector for use with the hybrid cable in FIG. 4.

FIG. 4 is a cross-sectional view of an alternate embodiment of a hybrid cable according to the disclosure. FIG. 5 is an end view of a connector for use with cable 200 of FIG. 4. Similar to the embodiment shown in FIGS. 1-3, cable 200 (shown in FIG. 4) includes a cover 202, a first power conductor 204 an insulating layer 206 and a second power conductor 208. First and second power conductors 204, 208 may be braided metal sheaths. Disposed radially within second conductor 208 is a core 230. Core 230 may include a cover 210 formed from a suitable non-conductive material. Positioned within core 230 are four twisted pair signal conductors 214. Core 230 may also include insulating material 212 disposed around twisted pair signal conductors 214. In one variation, core 230 may include strengthening members 236 to enhance the strength of cable assembly 200 and provide further protection for twisted pair conductors 214. Strengthening members 236 may be formed from wire, plastic filaments or strands and/or other suitable fibers.

Referring to FIG. 5, connector 216 is similar in structure to connector 116 shown in FIGS. 2b and 3. Housing 218 is similar to housing 118, blade 220 is similar to blade 120, and contact 222 is similar to contact 124. Twisted pair signal conductors 214 are connected to pins 232 and contacts 228 in pin receptacles 226 in the same manner as previously described in connection with the embodiment shown in FIGS. 1-3. A metallic or plastic shield or cover (not shown), similar to collar 134 of FIG. 3 may be provided to couple connector 216 to a mating connector or receptacle and to provide protection for the connection.

Figure 6:
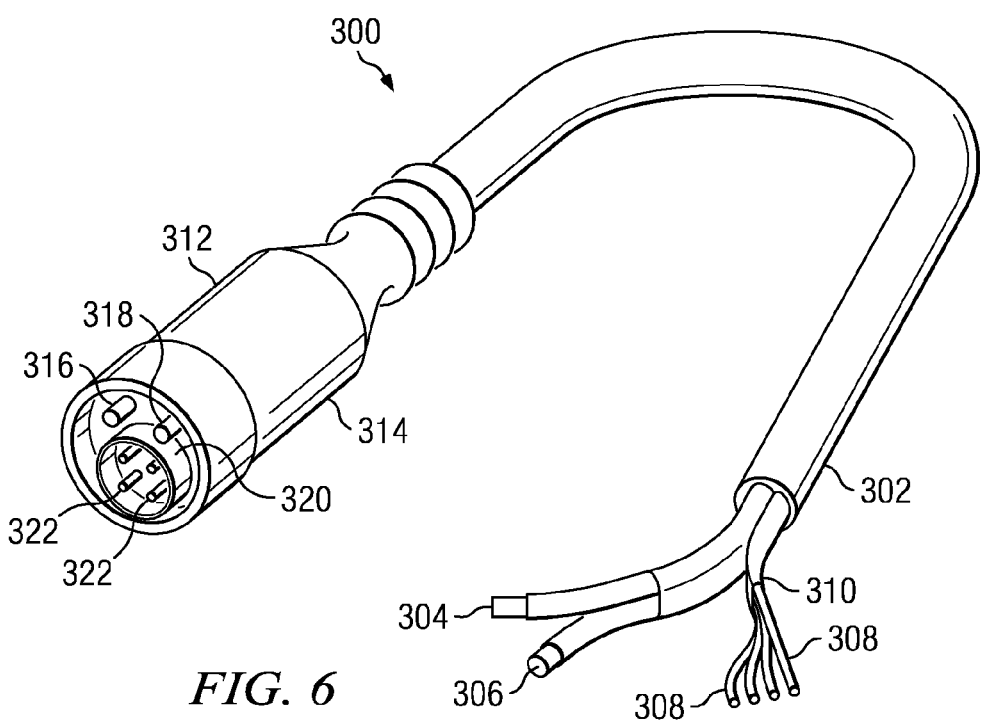
FIG. 6 is a partial perspective view of a second alternate embodiment of a hybrid cable according to the disclosure.

FIG. 6 is a perspective view of a second alternative hybrid cable according to the disclosure. As illustrated, hybrid cable 300 includes a cover 302, which may be formed from a suitable plastic such as polyvinylchloride, polyethylene and/or Teflon®. In one variation, a male connector 312 is mounted on an end of hybrid cable 300. As illustrated, connector 312 includes housing 314, first and second power prongs 316 and 318 that are connected to power leads or conductors 304 and 306 respectively. Connector 312 also includes a plurality of signal transmission pins 322 mounted inside of a metallic shield 320. Pins 322 are connected to signal conductors 308, which may be twisted pair conductors similar to those shown in FIG. 1. In one embodiment, signal conductors 308 are encased in a braided metal sheath 310 which is connected to shield 320 for the purpose of shielding the conductors from electro-magnetic interference. Power conductors 304, 306 along with signal conductors 308 are encased in cover 302. Hybrid cable 300 provides for both power and data transmission over a single integrated cable. In the illustrated embodiment, four twisted pair signal conductors 308 are illustrated; however, a lesser or greater number may be used. The use of four twisted pair signal conductors allows for 1,000Base-T physical connectivity.

Figure 7:
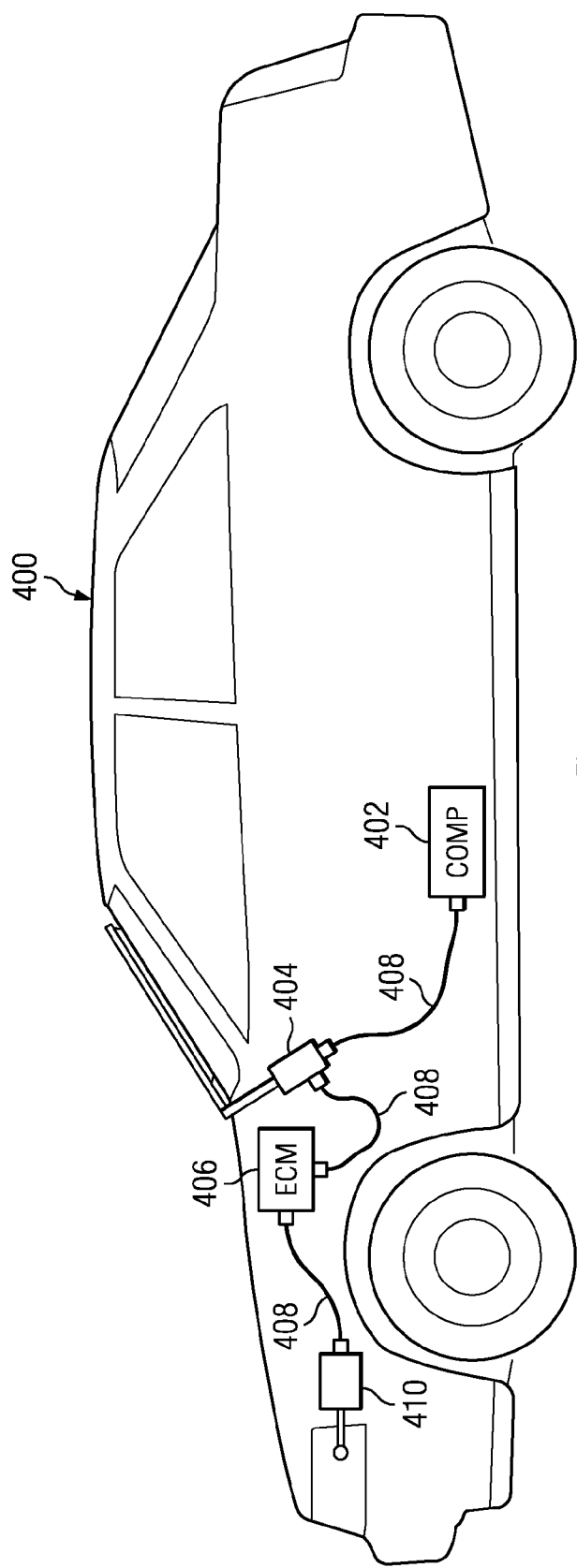
FIG. 7 is a schematic representation of a vehicle utilizing hybrid cables according to the disclosure.

FIG. 7 is a schematic representation of a vehicle 400 utilizing hybrid cables according to the disclosure. In one variation, a host computer 402 is provided for controlling electrical equipment and for receiving and processing inputs from various sensors located on the vehicle. In one variation, hybrid cables 408, similar to those described in connection with FIGS. 1a, 4 and 6 are used to connect host computer 402 to various devices and sensors. For example, cables 408 may be used to connect host computer 402 to a windshield wiper motor 404, an engine control module 406 and to headlights 410. The use of hybrid cables 408 enables these devices to be sequentially connected in a "daisy chain," thereby eliminating the need for separate wiring for each device. Each device may provided with a network adapter and/or be assigned a unique address, such as a Media Access Control (MAC) or Ethernet Hardware Address (EHA) for the purpose of identifying signals originating from or conveyed to the device. Other devices that may be connected to host computer 402 utilizing hybrid cables 408 include pressure and temperature sensors, passenger presence sensors mounted in the vehicle seats, flow meters and level sensors that monitoring the amount of fuel in the vehicle's tank and the flow of fuel to the vehicle's engine. Data conveyed over hybrid cables may be used to monitor and collect information reflecting the operation and performance of the vehicle while simultaneously providing operating power for electrically powered devices.

FIG. 8a is a perspective view of an alternate hybrid cable 800 according to the disclosure. Cable 800 includes a cable portion 802 and identical circular connector portions 804. In one embodiment, cable portion 802 includes an exterior protective sleeve 806 which may be a heat shrink wrap or sleeve or a molded overlay. Sleeve 806 is disposed over a plurality of power and data conductors (FIG. 8c) and may be formed from a suitable plastic such as polyethylene, polyvinyl chloride or Teflon®. Each of connector portions 804 comprises a pin and socket type connector with a cylindrical metal body 808 with a flexible heat shrink boot or cover 810 disposed over body portion 808. Cover 810 seals connector portions 804 against water, dirt and dust and provides mechanical strength at the juncture of cable portion 802 and connector portions 804. Each of connector portions 804 may be configured as a bayonet-type connector with connecting pins 812 and/or slots 814 for receiving connecting pins 812 of a mating connector. Protective plugs or caps 805 may be provided to protect connector portions 804 from water, dirt or dust when the connector portions are not mated with a corresponding connector.

FIG. 8c is a cross-section of cable portion 802 of hybrid cable 800. As illustrated, a plurality of stranded power conductors 816 is wound longitudinally in a spiral configuration around a centrally located data transmission core 818. In the embodiment illustrated in FIG. 8c, twelve 14-gauge stranded wire conductors (6 current and 6 neutral) are wound over data transmission core 818. As previously noted, the use of paired (current and neutral) conductors eliminates the need for grounding electrically powered devices to a vehicle's frame or body since one of the paired power conductors provide a neutral or ground connection. Power conductors 816 may be insulated with an insulating material rated for high temperature applications. In one embodiment, the power conductors 816 illustrated in FIG. 8c are sized and insulated for 25 Amps at 125 degrees centigrade for a nominal load capacity of 150 amps for hybrid cable 800. A greater or lesser number of power conductors 816 may, of course, be used depending upon the specific application.

In the illustrated embodiment, data transmission core 818 includes four pairs 820 of stranded, twisted pair signal conductors 822. A greater or lesser number of pairs 820 of signal conductors 822 may be used depending upon the particular application. The use of twisted pairs 820 of signal conductors 822, which typically have differing twist rates (twists per meter), minimizes noise or interference, (e.g., crosstalk) between the signal conductors. In one embodiment, data transmission core 818 comprises one or more Category 5, 5e or 6 Ethernet cables, enabling data transmission rates of up to 10 Mbits/sec, 100 Mbits/sec or 1000 Mbits/sec of data depending upon the specific configuration of hybrid cable 800.

FIG. 8b is a schematic representation of the wire entry configuration of connector portion 804 of hybrid cable 800. In one embodiment, the ends of each of power and signal conductors 816, 822, are crimped onto a pin, which is mounted in connecting portion 804 for mating with a corresponding connector. FIG. 8e is a wiring schematic illustrating one possible arrangement of the connection arrangement of power and signal conductors 816, 822, respectively.

Figure 8D:
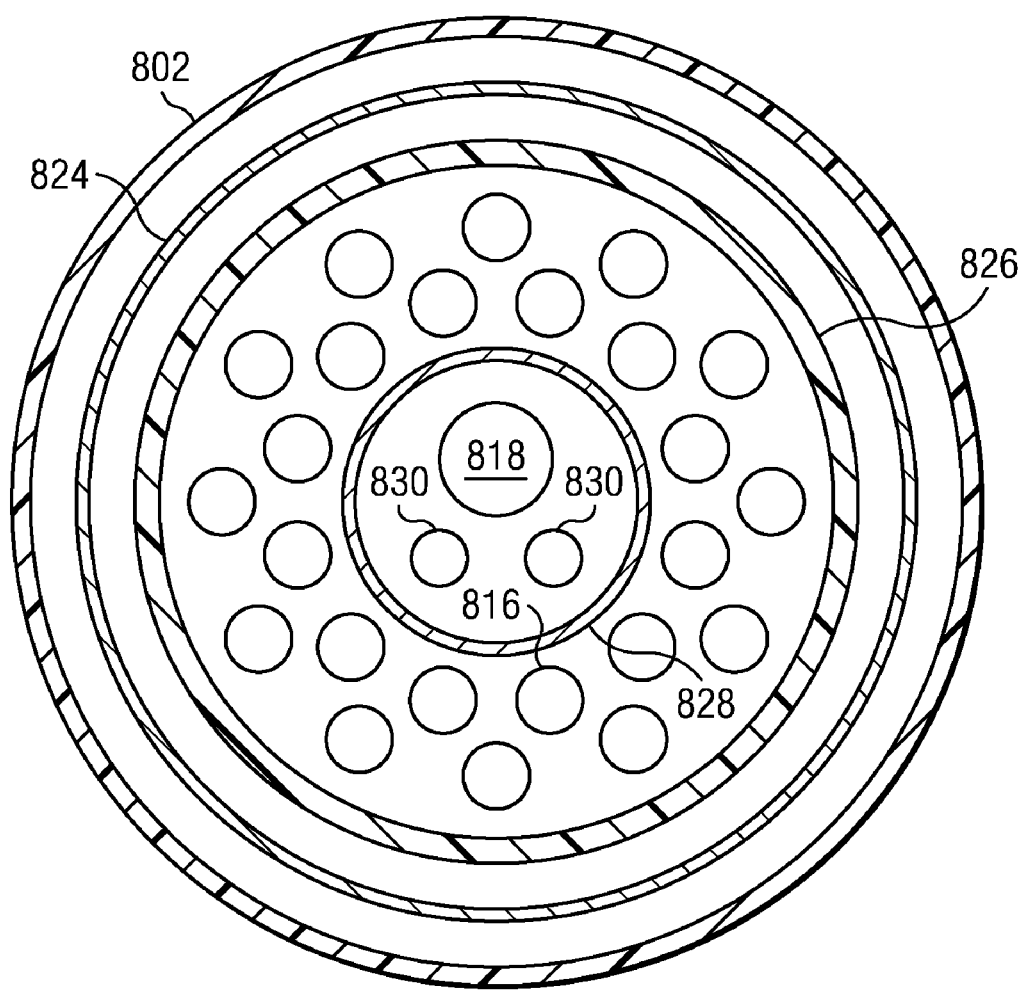
Figure 8E:
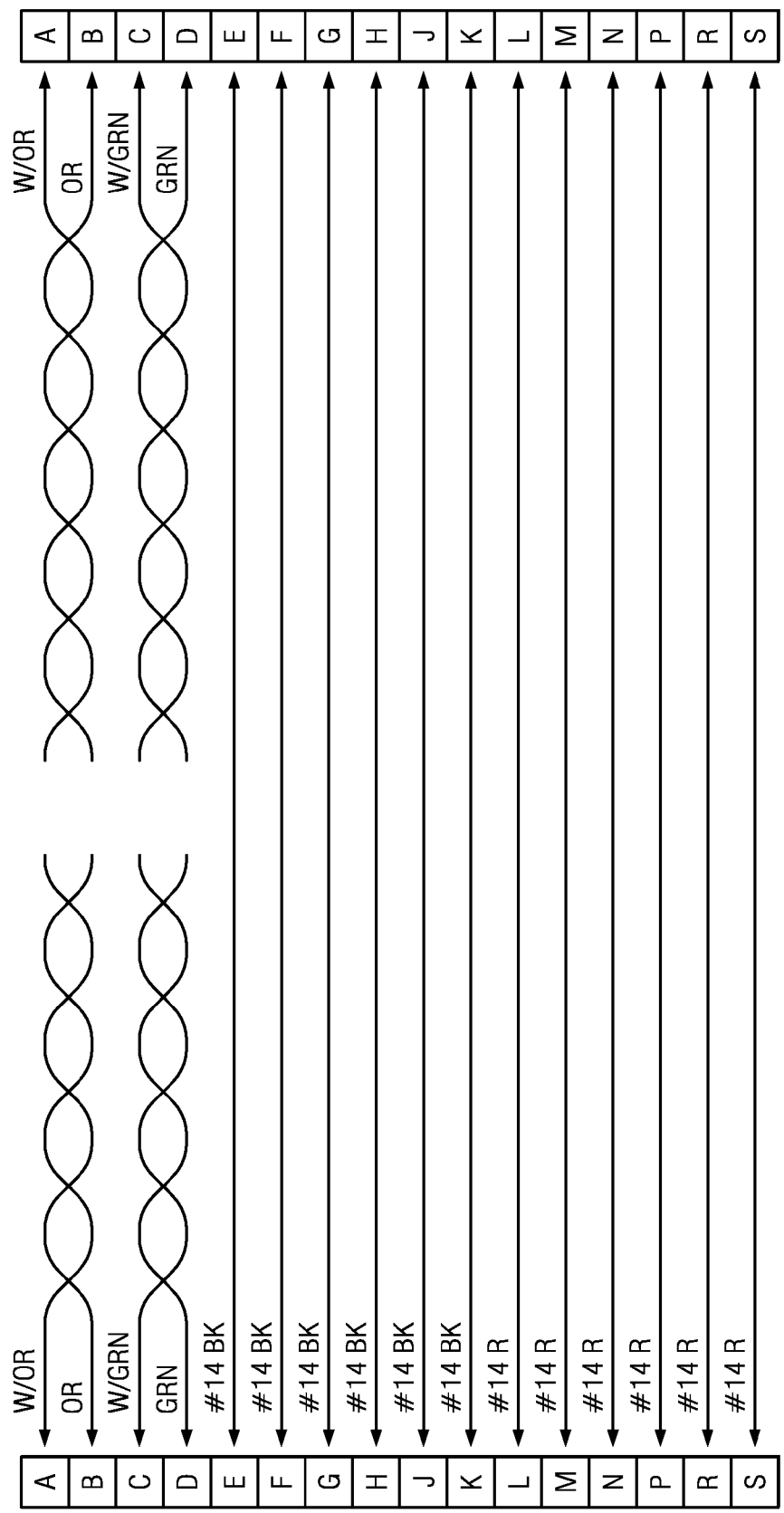

FIG. 8d is a partial cross-section representing alternate configurations of cable portion 802 of hybrid cable 800. In different embodiments, cable portion 802 may include a braided conductive shield 824 positioned between exterior protective sleeve 806 and power conductors 816 to minimize noise and interference from external sources. In other embodiments, a layer of protective armor 826, similar to a flexible conduit, may be disposed between exterior protective sleeve 806 and power conductors 816 to provide additional physical protection for the conductors. A braided conductive shield 828 may be positioned between power conductors 816 and core 818 to minimize interference with data transmission on signal conductors 822. Data transmission core 818 may be provided with an insulating jacket or sleeve (not shown). Braided conductive shield 824, protective armor 826 and braided conductive shield 828 extend continuously between connector portions 804 (FIG. 8a) of hybrid cable 800. In yet another embodiment, one or more fiber optic conductors 830 may be incorporated into cable portion 802 to provide an alternate or additional means of data transmission. In this embodiment, fiber optic conductors 830 extend continuously between connector portions 804 and the connector portions are provided with appropriate termination connections for fiber optics.

Figure 9A:
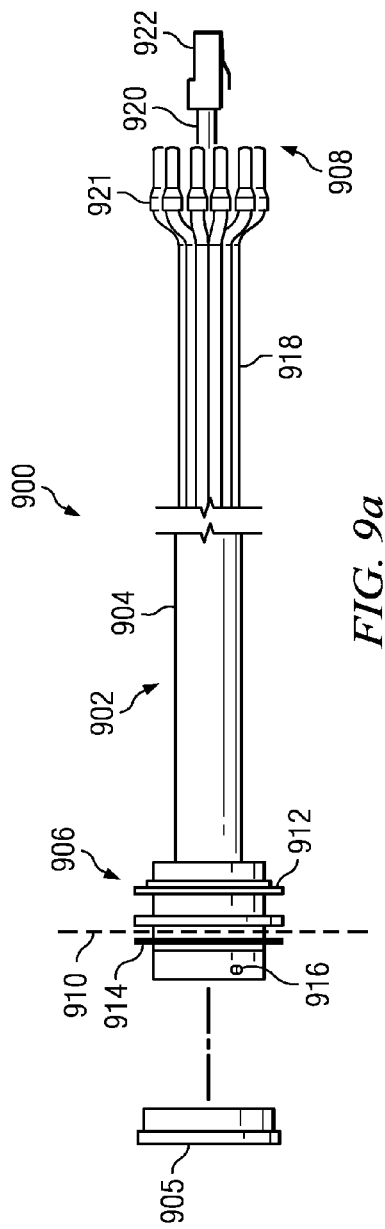
FIG. 9a is a partial perspective, partial cutaway view of one embodiment of a hybrid bulkhead cable according to the disclosure.

FIG. 9a is a partial perspective, partial cutaway view of one embodiment of a hybrid bulkhead cable 900 according to the disclosure. Hybrid bulkhead cable 900 includes a cable portion 902 including a heat shrink exterior cover 904. Hybrid bulkhead cable 900 also includes a first connector portion 906 and a second terminal end connector portion 908. First connector portion 906 is adapted for mounting to an enclosure or bulkhead 910 and includes a nut plate 912 and a threaded nut 914 for fastening the first connector portion to the bulkhead. First connector portion 906 may be mounted from either side of bulkhead 910, depending upon the specific configuration. First connector portion 906 may be configured with a bayonet connection including pins 916 adapted to be received in slots formed in a corresponding mating connector such as connector portions 804 of hybrid cable 800. A protective cap 905 may be provided to protect first connector portion 906 from moisture and dirt when the connector portion is not mated to a corresponding connector. In various embodiments, hybrid bulkhead cable 900 may be configured with armor, shielding and fiber optic conductors as illustrated and described in connection with FIG. 8d.

Figure 9C:
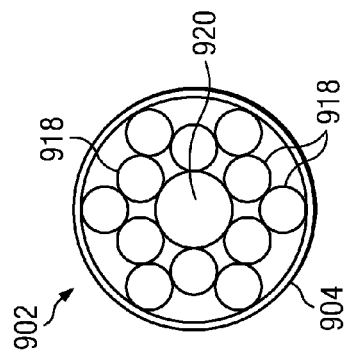
Figure 9B:
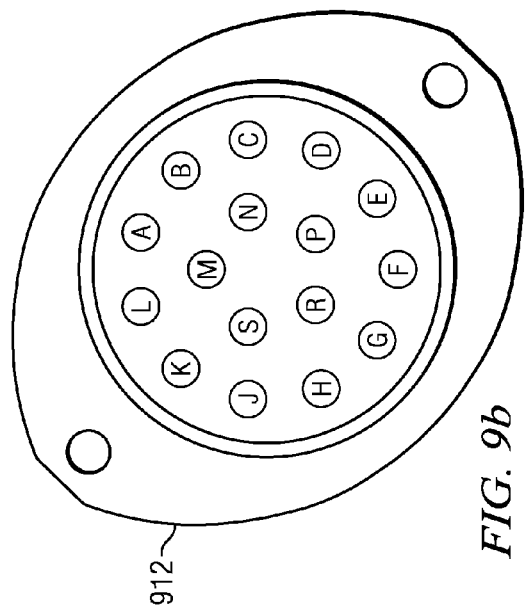

FIG. 9b is a schematic representation of the wire entry configuration of first connector portion 906 of hybrid bulkhead cable 900 wherein the individual power and data conductors are designated A-M. FIG. 9c is a partial cross-section of the cable portion 902 of hybrid bulkhead cable 900. Referring to FIGS. 9a, 9b and 9c, cable portion 902 of hybrid bulkhead cable 900 includes power conductors 918, similar or identical to power conductors 816 of hybrid cable 800. Power conductors 918 may be terminated with insulated ferrules 921 for connection to a mating connector. Cable portion 902 also includes a data transmission core 920 similar or identical to data transmission core 818 of hybrid cable 800 (FIG. 8c). In one embodiment, data transmission core 920 includes four pairs of stranded, twisted pair signal conductors that provide the capability of transmitting 10 Mbits/sec, 100 Mbits/sec or 1000 Mbits/sec of data, depending upon the specific configuration of bulkhead cable 900.

Figure 9D:
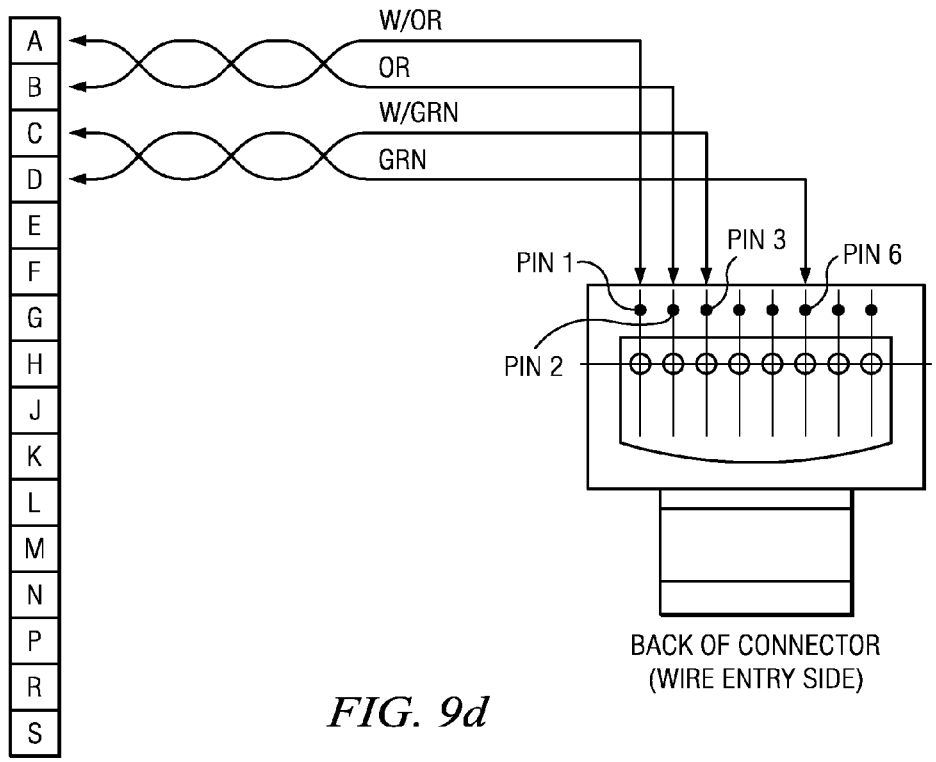
Figure 9E:
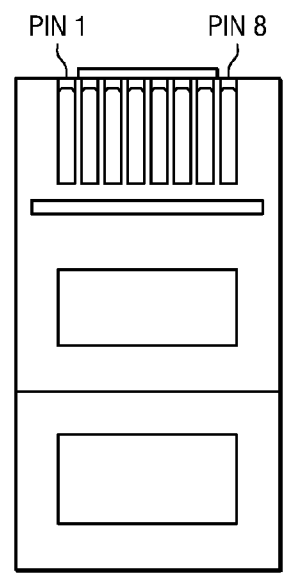
FIG. 9e is a schematic representation illustrating the pin order for connection of the signal conductors of the hybrid bulkhead cable of FIG. 9a to an Ethernet plug.

In the illustrated embodiment, the signal conductors of data transmission core 920 are terminated in an Ethernet plug 922. Alternatively, the signal conductors of data transmission core 920 may be terminated with individual pins or soldered onto a terminal strip or connections of a printed circuit board. FIG. 9d is a wire entry schematic illustrating the pin connection configuration of the signal conductors in first connector portion 906 and FIG. 9e illustrates the pin order for connection of the signal conductors of hybrid bulkhead cable 900 to Ethernet plug 922.

It will be appreciated by those skilled in the art having the benefit of this disclosure that this hybrid cable for conveying data and power provides a hybrid cable for conveying power and data that is adapted for use in vehicles such as automobiles. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A vehicle having a vehicle electrical system including electrically operated sensors and electrically powered devices;
the vehicle electrical system including at least one hybrid cable having a centrally located data transmission core including a plurality of stranded, twisted pair signal conductors, a plurality of paired neutral and current stranded power conductors wound longitudinally in a spiral configuration around the centrally located data transmission core and an outer cover for enclosing the signal conductors and power conductors, the neutral and current stranded power conductors including stranded wire conductors having a nominal load capacity of at least 150 Amps; and
the hybrid cable further comprising a connector disposed on each end of the hybrid cable, the connector including one of a connecting pin or receptacle having a contact for each of the signal conductors and a power contact connected to each of the paired neutral and current stranded power conductors, wherein the hybrid cable is utilized to connect a host computer resident on the vehicle with one or more electrically powered devices of the vehicle.

2. The vehicle of claim 1, wherein the hybrid cable further comprises a braided conductive shield positioned between the exterior protective sleeve and the power conductors.

3. The vehicle of claim 1, wherein the hybrid cable further comprises a braided conductive shield positioned between the power conductors and the signal conductors.

4. The vehicle of claim 1, wherein the centrally located data transmission core of the hybrid cable includes at least two twisted pairs of signal conductors.

5. The vehicle of claim 4, wherein the signal conductors of the centrally located transmission core can convey up to 10 Mbits/sec of data.

6. The vehicle of claim 4, wherein the signal conductors of the centrally located transmission core can convey up to 100 Mbits/sec of data.

7. The vehicle of claim 1, wherein the centrally located data transmission core of the hybrid cable includes at least four twisted pairs of signal conductors and wherein the signal conductors can transmit up to 1000 Mbits/sec of data.

8. The hybrid cable of claim 1, further comprising one or more fiber optic conductors extending continuously between the connectors and wherein the connectors are provided with termination connections for fiber optics.

9. The vehicle of claim 1 wherein at least one of the electrically powered devices of the vehicle is provided with a network adapter and assigned a unique address.

10. The vehicle of claim 9 wherein the unique address is one of a Media Access Control (MAC) address or Ethernet Hardware Address (EHA) for the purpose of identifying signals originating from or conveyed to the device.

* * * * *